(12) United States Patent
Ma et al.

(10) Patent No.: US 10,989,044 B2
(45) Date of Patent: Apr. 27, 2021

(54) MODELED TRANSMITTER AND RECEIVER COILS WITH VARIABLE TITLE ANGLES FOR FORMATION SCANNING

(71) Applicant: Halliburton Energy Services, Inc., Houston, TX (US)

(72) Inventors: Jin Ma, Singapore (SG); Glenn Andrew Wilson, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 146 days.

(21) Appl. No.: 15/556,577

(22) PCT Filed: Oct. 3, 2016

(86) PCT No.: PCT/US2016/055178
§ 371 (c)(1),
(2) Date: Sep. 7, 2017

(87) PCT Pub. No.: WO2018/067112
PCT Pub. Date: Apr. 12, 2018

(65) Prior Publication Data
US 2018/0371893 A1 Dec. 27, 2018

(51) Int. Cl.
*E21B 47/0228* (2012.01)
*G01V 3/28* (2006.01)
(Continued)

(52) U.S. Cl.
CPC ........ *E21B 47/0228* (2020.05); *E21B 47/017* (2020.05); *E21B 47/26* (2020.05); *G01V 3/26* (2013.01); *G01V 3/28* (2013.01)

(58) Field of Classification Search
CPC ............. E21B 47/011; E21B 47/02216; E21B 47/124; G01V 3/26; G01V 3/28
See application file for complete search history.

(56) References Cited

U.S. PATENT DOCUMENTS

| | | | | |
|---|---|---|---|---|
| 4,940,943 A | * | 7/1990 | Bartel | G01V 3/30 324/338 |
| 6,476,609 B1 | * | 11/2002 | Bittar | G01V 3/30 324/338 |

(Continued)

FOREIGN PATENT DOCUMENTS

| | | |
|---|---|---|
| EP | 1315984 | 1/2011 |
| WO | 2009029517 | 8/2010 |

(Continued)

OTHER PUBLICATIONS

Preliminary French Search Report for Application No. PAT2528072FR00, dated May 21, 2019.
(Continued)

*Primary Examiner* — Manuel A Rivera Vargas
*Assistant Examiner* — Yaritza H Perez Bermudez
(74) *Attorney, Agent, or Firm* — Benjamin Ford; C. Tumey Law Group PLLC

(57) ABSTRACT

A system, in some embodiments, comprises: a drill string; a first receiver coil coupled to the drill string at a fixed tilt angle with respect to a longitudinal axis of the drill string; a second receiver coil coupled to the drill string at another fixed tilt angle with respect to the longitudinal axis of the drill string; and a processor coupled to the first and second receiver coils and configured to trigonometrically manipulate a response of the first receiver coil and a response of the second receiver coil to determine a response of a modeled receiver coil having a desired tilt angle with respect to the longitudinal axis of the drill string, wherein said responses are based on a subterranean formation layer.

21 Claims, 8 Drawing Sheets

(51) Int. Cl.
*E21B 47/017* (2012.01)
*E21B 47/26* (2012.01)
*G01V 3/26* (2006.01)

(56) References Cited

U.S. PATENT DOCUMENTS

| | | | |
|---|---|---|---|
| 6,727,705 B2 | 4/2004 | Frey et al. | |
| 6,819,110 B2 | 11/2004 | Omeragic et al. | |
| 6,934,635 B2 | 8/2005 | Kennedy | |
| 7,202,670 B2 | 4/2007 | Omeragic et al. | |
| 7,379,818 B2 | 5/2008 | Rabinovich | |
| 7,538,555 B2 | 5/2009 | Banning et al. | |
| 7,786,733 B2 | 8/2010 | Seydoux et al. | |
| 7,848,887 B2* | 12/2010 | Yang | E21B 7/04 702/9 |
| 8,055,448 B2 | 11/2011 | Mathiszik et al. | |
| 8,200,437 B2 | 6/2012 | Davydycheva et al. | |
| 8,264,228 B2 | 9/2012 | Bittar et al. | |
| 8,347,985 B2 | 1/2013 | Bittar et al. | |
| 8,749,243 B2 | 6/2014 | Bittar et al. | |
| 8,862,405 B2 | 10/2014 | Seydoux et al. | |
| 8,917,094 B2 | 12/2014 | Bittar et al. | |
| 9,063,244 B2 | 6/2015 | Allen | |
| 9,557,439 B2 | 1/2017 | Wilson et al. | |
| 2004/0113626 A1* | 6/2004 | Wang | G01V 3/28 324/339 |
| 2009/0179647 A1* | 7/2009 | Wang | G01V 3/28 324/339 |
| 2009/0230968 A1* | 9/2009 | Bittar | E21B 47/024 324/338 |
| 2011/0084697 A1* | 4/2011 | Wisler | G01B 7/001 324/346 |
| 2011/0180327 A1* | 7/2011 | Bittar | E21B 47/0905 175/61 |
| 2011/0238312 A1 | 9/2011 | Seydoux et al. | |
| 2012/0283951 A1* | 11/2012 | Li | G01V 3/30 702/7 |
| 2012/0298420 A1 | 11/2012 | Seydoux et al. | |
| 2013/0141102 A1 | 6/2013 | Donderici et al. | |
| 2013/0191028 A1 | 7/2013 | Homan et al. | |
| 2013/0226459 A1 | 8/2013 | Gorex | |
| 2013/0285665 A1* | 10/2013 | Wu | G01V 3/28 324/339 |
| 2013/0289880 A1 | 10/2013 | Gorek | |
| 2013/0311094 A1 | 11/2013 | Donderici et al. | |
| 2014/0032116 A1 | 1/2014 | Guner et al. | |
| 2014/0249754 A1 | 9/2014 | Donderici et al. | |
| 2014/0350858 A1* | 11/2014 | Donderici | G01V 3/38 702/7 |
| 2015/0369952 A1* | 12/2015 | Wu | G01V 3/38 702/7 |
| 2016/0356911 A1 | 12/2016 | Wilson et al. | |
| 2017/0306701 A1* | 10/2017 | Wu | E21B 47/022 |
| 2019/0032472 A1* | 1/2019 | Ahmadi Kalateh Ahmad | E21B 47/02216 |

FOREIGN PATENT DOCUMENTS

| | | |
|---|---|---|
| WO | 2014003702 | 1/2014 |
| WO | 2014098838 | 6/2014 |
| WO | 2014098840 | 6/2014 |
| WO | 2014120150 | 8/2014 |
| WO | 2015047256 | 4/2015 |
| WO | 2017065721 | 10/2015 |
| WO | 2017069753 | 10/2015 |
| WO | 2014098919 | 6/2016 |

OTHER PUBLICATIONS

Well Logging Lab Technical Report No. 33 by Yin et al. Published by the University of Houston in 2012.
International Search Report and Written Opinion by PCT/US2016/055178 dated Jun. 28, 2017.

* cited by examiner

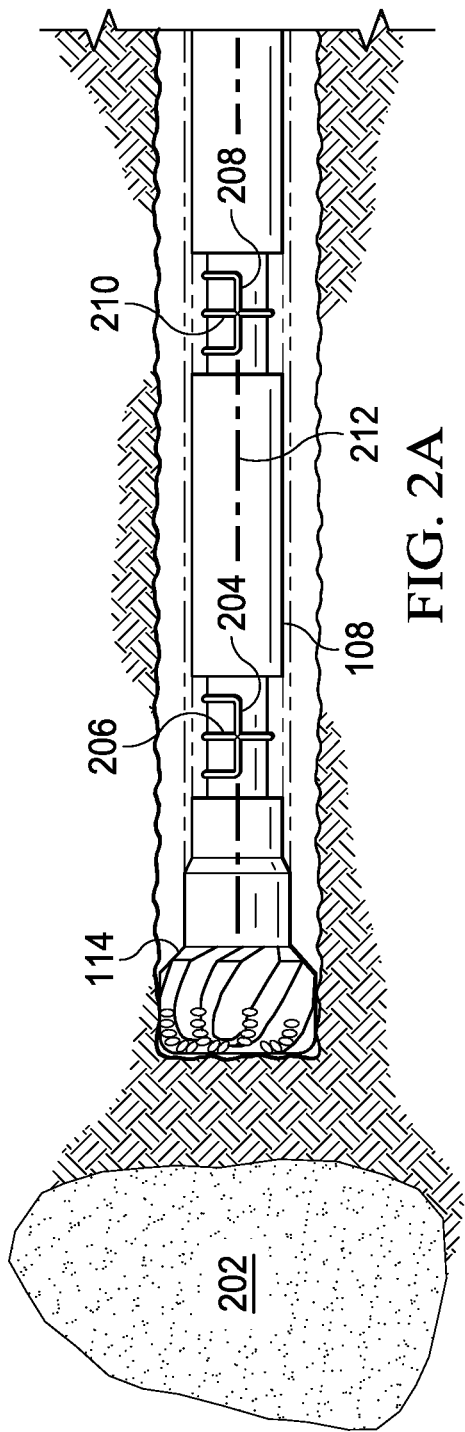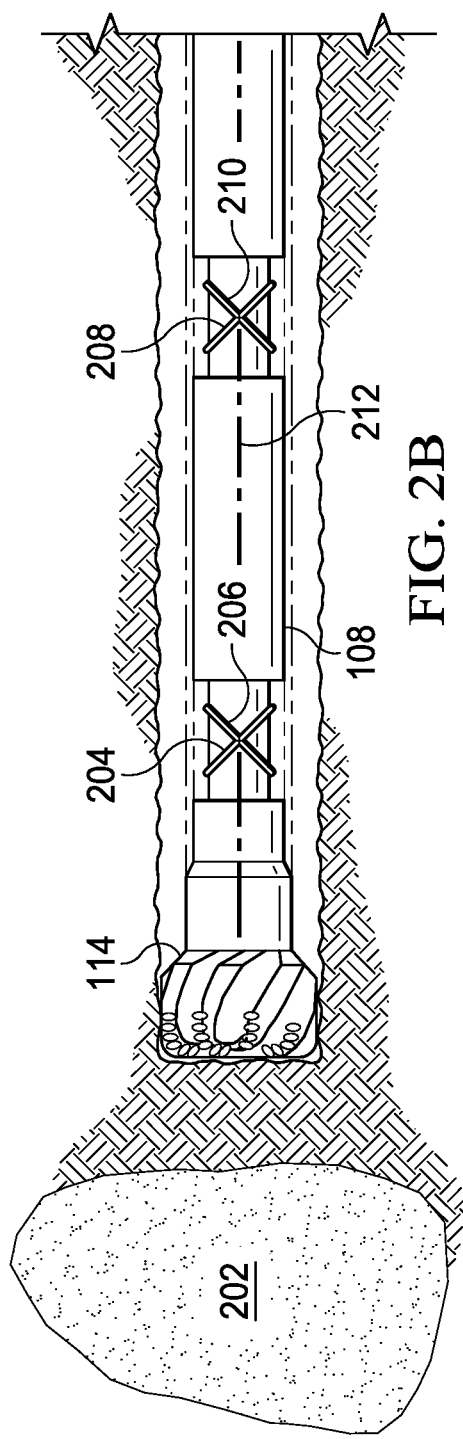

MODELED TRANSMITTER AND RECEIVER COILS WITH VARIABLE TITLE ANGLES FOR FORMATION SCANNING

BACKGROUND

Transmitter and receiver coils are frequently used in drilling operations to collect information about the formation into which a borehole is being drilled. This information is used to make informed decisions about the drilling operations—for instance, drill string inclination ("geosteering") and whether to drill into a new formation layer ("geostopping"). The usefulness of such transmitter and receiver coils is limited, however, because the coils are positioned in a fixed location and at a fixed tilt angle with respect to the longitudinal axis of the drill string. If the coils cannot be physically rotated, it is difficult to scan the formation ahead of the drill bit. As a result, geosteering and geostopping decisions must be made based on limited information.

BRIEF DESCRIPTION OF THE DRAWINGS

In the drawings:

FIG. 2A is a schematic diagram of a portion of the drill string having transverse and coaxial coils.

FIG. 2B is another schematic diagram of a portion of the drill string having cross-tilted coils.

DETAILED DESCRIPTION

Disclosed herein are various techniques for collecting data about a subterranean formation using transmitter and receiver coils that are positioned in fixed locations on the drill string and at fixed tilt angles with respect to the longitudinal axis of the drill string. Although these transmitter and receiver coils are fixed, they are manipulated in other ways to model transmitter and receiver coils that can be physically moved. In this way, physically fixed transmitter and receiver coils are used to collect data about the subterranean formation that would otherwise be unavailable. More specifically, in some embodiments, the current passing through one or more transmitter coils in a transmitter set may be dynamically adjusted to model a transmitter coil with a variable tilt angle that can be adjusted as desired. (The term "tilt angle," as used herein, refers to the angle of the magnetic flux generated or received by a coil relative to the longitudinal axis of the drill string on which the coil is mounted. This is because the coil with a current loop can be described as a magnetic dipole whose magnetic flux is perpendicular to the coil loop plane. Thus, the direction of the magnetic flux directly relates to the orientation of the coil.) In some embodiments, voltage responses received by multiple receiver coils in a receiver set may be trigonometrically manipulated to effectively point a modeled receiver coil at any desired tilt angle. Using these techniques, fixed transmitter and receiver coil sets can be used to scan the formation at a variety of angles, thus providing significantly more information than would otherwise be available to make geosteering and geostopping decisions. These techniques are now described in greater detail with respect to FIGS. 1-7.

Figure 1A:
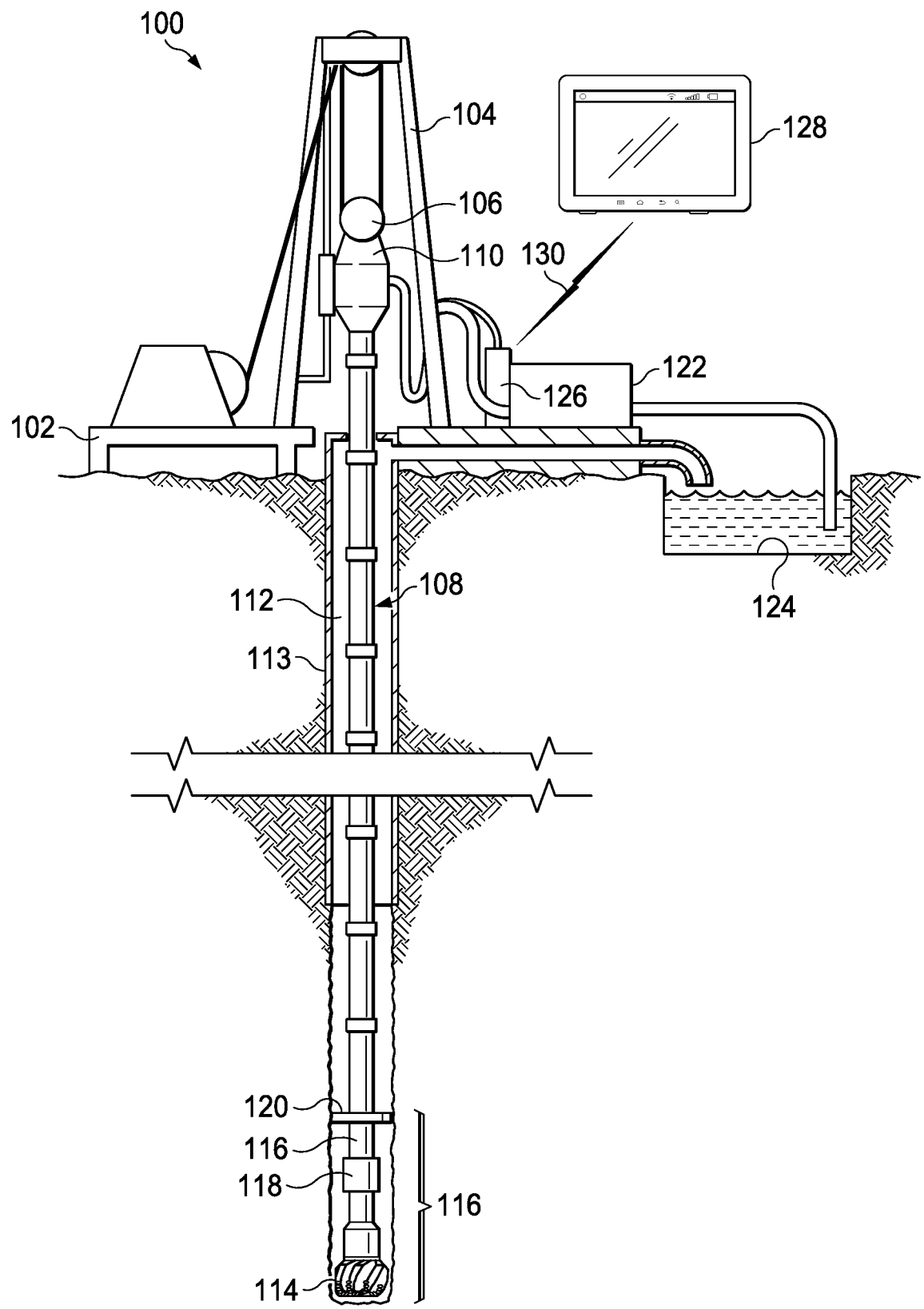
FIG. 1A is a schematic diagram of an illustrative drilling environment.

FIG. 1A is a schematic diagram of an illustrative drilling environment 100. The drilling environment 100 comprises a drilling platform 102 that supports a derrick 104 having a traveling block 106 for raising and lowering a drill string 108. A top-drive motor 110 supports and turns the drill string 108 as it is lowered into a borehole 112. The drill string's rotation, alone or in combination with the operation of a downhole motor, drives the drill bit 114 to extend the borehole 112. The drill bit 114 is one component of a bottomhole assembly (BHA) 116 that may further include a rotary steering system (RSS) 118 and stabilizer 120 (or some other form of steering assembly) along with drill collars and logging instruments. A pump 122 circulates drilling fluid through a feed pipe to the top drive 110, downhole through the interior of drill string 108, through orifices in the drill bit 114, back to the surface via an annulus around the drill string 108, and into a retention pit 124. The drilling fluid transports formation samples—i.e., drill cuttings—from the borehole 112 into the retention pit 124 and aids in maintaining the integrity of the borehole. Formation samples may be extracted from the drilling fluid at any suitable time and location, such as from the retention pit 124. The formation samples may then be analyzed at a suitable surface-level laboratory or other facility (not specifically shown). While drilling, an upper portion of the borehole 112 may be stabilized with a casing string 113 while a lower portion of the borehole 112 remains open (uncased).

The drill collars in the BHA 116 are typically thick-walled steel pipe sections that provide weight and rigidity for the drilling process. As described in detail below, transmitter and receiver coils are mounted on the drill collars and the collars contain wireways to route conductive wire between the coils and one or more processors (e.g., a computer-controlled transmitter or receiver) that controls and communicates with the coils. The BHA 116 typically further includes a navigation tool having instruments for measuring tool orientation (e.g., multi-component magnetometers and accelerometers) and a control sub with a telemetry transmitter and receiver. The control sub coordinates the operation of the various logging instruments, steering mechanisms, and drilling motors, in accordance with commands received from the surface, and provides a stream of telemetry data to the surface as needed to communicate relevant measurements and status information. A corresponding telemetry receiver and transmitter is located on or near the drilling platform 102 to complete the telemetry link. One type of telemetry link is based on modulating the flow of drilling fluid to create pressure pulses that propagate along the drill string ("mud-pulse telemetry or MPT"), but other known telemetry techniques are suitable. Much of the data obtained by the control sub may be stored in memory for later retrieval, e.g., when the BHA 116 physically returns to the surface.

A surface interface 126 serves as a hub for communicating via the telemetry link and for communicating with the various sensors and control mechanisms on the platform 102. A data processing unit (shown in FIG. 1A as a tablet computer 128) communicates with the surface interface 126 via a wired or wireless link 130, collecting and processing measurement data to generate logs and other visual representations of the acquired data and the derived models to facilitate analysis by a user. The data processing unit may take many suitable forms, including one or more of: an embedded processor, a desktop computer, a laptop computer, a central processing facility, and a virtual computer in the cloud. In each case, software on a non-transitory information storage medium may configure the processing unit to carry out any desired processing, modeling, and display generation. The data processing unit may also contain storage to store, e.g., data received from tools in the BHA 116 via mud pulse telemetry or any other suitable communication technique. The scope of disclosure is not limited to these particular examples of data processing units. For example, one or more processors may be housed within various portions of the drill string and may execute software stored on a storage medium coupled to the processor(s) to cause the processor(s) to perform one or more of the techniques described herein.

Figure 1B:
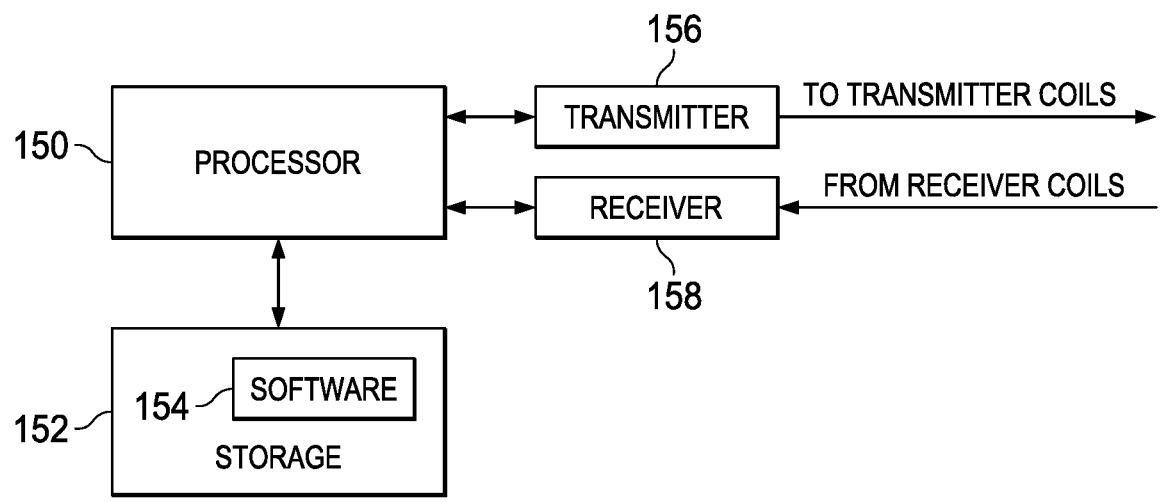
FIG. 1B is a block diagram of transmitter and receiver equipment.

FIG. 1B is a block diagram of transmitter and receiver equipment usable to perform at least some of the functions described herein. Specifically, FIG. 1B shows a processor 150 coupled to storage 152 (e.g., hard drive, RAM) comprising software 154. The processor 150, storage 152 and/or software 154 may in some embodiments be distributed. In some embodiments, the processor 150 and storage 152 are housed within the drill string 108 or at the surface. The processor 150 couples to a transmitter 156 and a receiver 158. The transmitter 156 and receiver 158, in at least some embodiments, are positioned within the drill string 108 downhole. The transmitter 156 couples to transmitter coils, such as those described herein, and the receiver 158 couples to receiver coils, such as those described herein.

FIG. 2A is a schematic diagram of a portion of the drill string 108 as it approaches a formation layer 202 that is ahead of the drill bit 114. One or more collars of the drill string 108 have mounted thereupon multiple transmitter and receiver coils. Specifically, the embodiment represented in FIG. 2A comprises transverse transmitter coil 204, coaxial transmitter coil 206, transverse receiver coil 208 and coaxial receiver coil 210 mounted on the drill string 108. The scope of disclosure is not limited to the specific number or arrangement of coils shown in FIG. 2A. For instance and without limitation, as shown in FIG. 2B, the transmitter coils 204, 206 and the receiver coils 208, 210 may be positioned in a cross-tilting arrangement. The transmitter and receiver coils in FIGS. 2A-2B are fixed in position and orientation on the drill string 108, meaning that they do not move relative to the drill string 108.

Referring again to FIG. 2A, the transmitter coil 204 is a transverse coil, meaning that its tilt angle (magnetic flux direction) with respect to the longitudinal axis 212 of the drill string 108 is 90 degrees. The transmitter coil 206, however, is a coaxial coil, meaning that its tilt angle with respect to the longitudinal axis 212 of the drill string 108 is 0 degrees. Because one of the transmitter coils has a 0 degree tilt angle and the other transmitter coil has a 90 degree tilt angle, the two transmitter coils may be modeled as a third transmitter coil that has a 45 degree tilt angle. This third transmitter coil does not physically exist; rather, it is simply a model of the net effect of the transmitter coils 204, 206 that do physically exist. The 45 degree tilt angle of the modeled transmitter coil assumes that the currents with which the transmitter coils 204, 206 are excited are identical or nearly identical. However, dynamically manipulating the currents flowing through one or both of these transmitter coils 204, 206 causes the tilt angle of the modeled transmitter coil to change. That is, when the currents flowing through the transmitter coils 204, 206 are no longer identical or substantially identical (i.e., the ratio of the currents is no longer 1.0), the tilt angle of the modeled transmitter coil with respect to the longitudinal axis 212 of the drill string 108 begins to change and is no longer 45 degrees. The advantage to this variable tilt angle is that signals may be transmitted into the formation at varying angles. The tilt angles of the transmitter coils 204, 206 are fixed because the coils themselves are physically fixed so that they cannot shift, rotate or otherwise move relative to the drill string 108. But by varying one or more of the transmitter coil currents as described above so that the ratio of the currents changes, the tilt angle at which the transmitter signals are actually emitted into the formation also changes. This phenomenon is explained in greater detail below.

After the transmitter coils 204, 206 transmit signals into the formation, the signals pass through the formation and return to the receiver coils 208, 210. Like the transmitter coils 204, 206, the receiver coils 208, 210 also are physically fixed relative to the drill string 108. Thus, the receiver coils 208, 210 can receive signals only at fixed tilt angles with respect to the longitudinal axis 212 of the drill string 108. However, the responses collected by the receiver coils 208, 210 may be mathematically (i.e., trigonometrically) manipulated to determine the response of a modeled receiver coil at any desired tilt angle. The modeled receiver coil, like the modeled transmitter coil, does not physically exist. Rather, it is a model representation of how the responses of the receiver coils 208, 210 can be manipulated to mimic the response that would be received by a single receiver coil at any desired tilt angle. This technique also is explained in greater detail below.

Figure 3A:
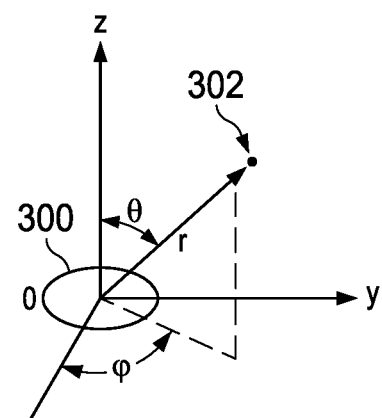
FIGS. 3A-3B are schematic diagrams of vertical and horizontal magnetic dipoles, respectively.
Figure 3B:
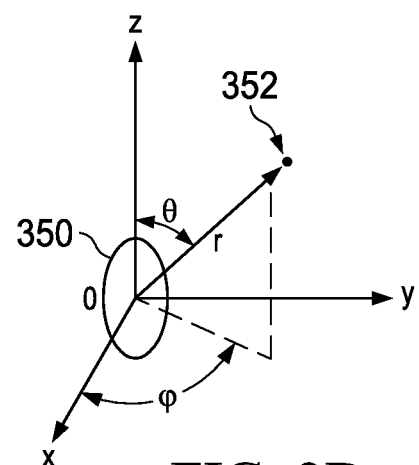

A coil is normally identical to a magnetic dipole. Thus, dipole theory may be used to analyze coil antennas. Accordingly, the dipole theory supporting the manipulation of the ratio of currents in the transmitter coils to model a transmitter coil with a variable tilt angle is now described. A coaxial coil antenna—such as transmitter coil 206—is equivalent to a vertical magnetic dipole (VMD), as shown in FIG. 3A. In FIG. 3A, axes x, y and z are illustrated. The VMD 300 represents the coaxial transmitter coil 206, and an electric field point 302 has spherical coordinates (r, θ, φ). The electric field of VMD can be expressed as follows:

$$\vec{E} = \hat{\varphi} \frac{-j\omega \mu I S \sin\theta}{4\pi r^2} e^{-jkr}(1 + jkr), \tag{1}$$

where I is the current of the transmitter coil, S is the area of the coil, k is the wave number, ω is the angular frequency, p is the magnetic permeability (assumed to be free space), and (r, θ, φ) are the coordinates of the field point in a spherical system. A transverse coil—such as transverse transmitter coil 204—is equivalent to a horizontal magnetic dipole (HMD), as shown in FIG. 3B. In FIG. 3B, axes x, y and z are shown. The HMD 350 represents the transverse transmitter coil 204, and an electric field point 352 has spherical coordinates (r, θ, φ). The electric fields of a HMD can be expressed as follows:

$$E_r = 0 \tag{2}$$

$$E_\theta = \frac{-j\omega\mu IS\cos\varphi}{4\pi r^2} e^{-jkr}(1 + jkr)$$

$$E_\varphi = \frac{j\omega\mu IS\sin\varphi\cos\theta}{4\pi r^2} e^{-jkr}(1 + jkr)$$

Similar to the VMD and HMD, a tilted coil is equivalent to a tilted magnetic dipole (TMD). According to the superposition theorem, a TMD is composed of VMD and HMD components. Accordingly, the electric field of a TMD is determined by the superposition of electric fields from the VMD and HMD as in equations (1) and (2). Its final form appears as follows:

$$\vec{E} = \hat{\theta}E_\theta + \hat{\varphi}E_\varphi = \hat{\theta}\frac{-j\omega\mu I_h S\cos\varphi}{4\pi r^2} e^{-jkr}(1 + jkr) + \tag{3}$$

$$\hat{\varphi}\frac{-j\omega\mu S(I_h\sin\varphi\cos\theta - I_v\sin\theta)}{4\pi r^2} e^{-jkr}(1 + jkr)$$

From equation (3), the directional factor for a tilted coil can be extracted as:

$$I_h \sin\varphi \cos\theta - I_v \sin\theta, \tag{4}$$

where $I_h$ is the current amplitude of HMD and IvD is the current amplitude of VMD. Because $I_h/I_v$ controls the tilt angle of the tilted dipole, adjusting the ratio $I_h/I_v$ by varying the currents $I_h$ and/or $I_v$ effectively changes the tilted angle of the dipole (i.e., the modeled transmitter coil). Stated another way, by adjusting $I_h/I_v$, the transmitter set can generate an electric field in different directions, which effectively models a tilted transmitter coil at different tilt angles. These currents may be dynamically manipulated by, e.g., a downhole processor (for instance, the processor 150 of FIG. 1B) indirectly coupled to the transmitter coils 204, 206 via intra-collar wireways and transmitter/transceiver equipment. The scope of disclosure encompasses all suitable techniques for varying the transmitter coils' currents.

As explained above, the responses of the receiver coils 208, 210 may be trigonometrically manipulated to calculate a response of a modeled receiver coil at any desired tilt angle. The net effect is similar to adjusting the $I_h/I_v$ used in the transmitter coils. Accordingly, the trigonometric manipulation of the receiver coil responses may be performed in lieu of, rather than in conjunction with, dynamic adjustment of the transmitter coil currents. The scope of disclosure, however, includes the performance of both techniques simultaneously, if desired. The trigonometric manipulation of the receiver coils' responses is now described.

Figure 4A:
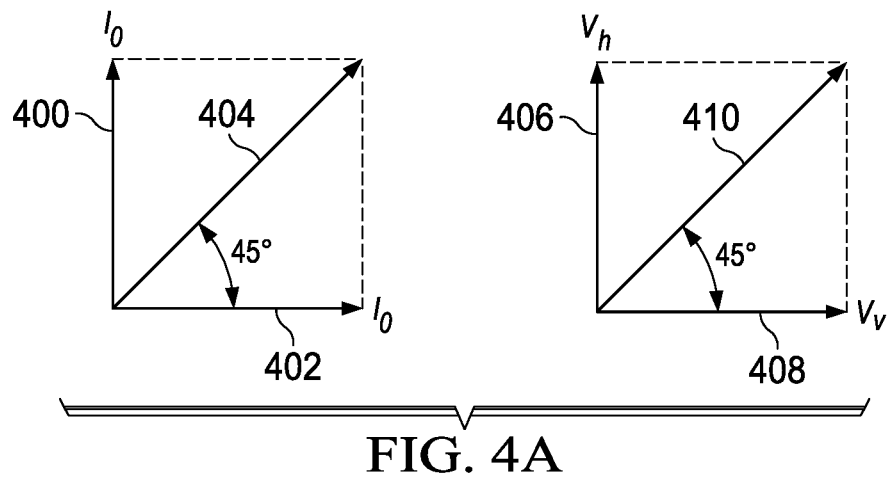
FIG. 4A is a schematic diagram of transmitter and receiver coil vectors having fixed tilt angles.
Figure 4B:
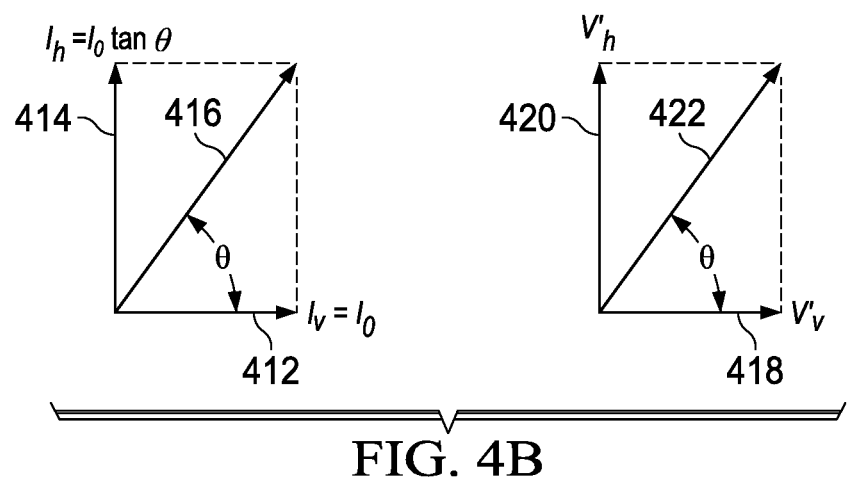
FIG. 4B is a schematic diagram of transmitter and receiver coil vectors having variable tilt angles.

FIG. 4A is a schematic diagram of three transmitter coil vectors 400, 402 and 404 and three receiver coil vectors 406, 408 and 410. The vectors 400 and 402 represent separate transmitter coils (e.g., transmitter coils 204, 206 as in FIGS. 2A-2B). The coil size, number of turns and currents passing through the transmitter coils may be adjusted so that the modeled transmitter coil (represented by vector 404) has a tilt angle of 45 degrees, as shown. Similarly, the vectors 406 and 408 represent separate receiver coils (e.g., receiver coils 208, 210 as in FIGS. 2A-2B). The tilt angle of the modeled receiver coil, as represented by vector 410, is also 45 degrees. The desired tilt angle—i.e., the angle relative to the longitudinal axis of the drill string at which scanning is desired—is θ, as shown in FIG. 4B. The transmitter coil vector 412 is shown as being equivalent to $I_0$, which is shown in FIG. 4A. However, transmitter coil vector 414 is $I_h$, which is $I_0$ multiplied by tan θ. The modeled transmitter coil vector 416 has a tilt angle of θ. Similarly, the receiver coil vector 418 is labeled $V_v'$ and the receiver coil vector 420 is labeled $V_h'$. The tilt angle of the modeled receiver coil vector 422 is θ. Thus, in FIG. 10, the relationship between the desired tilt angle θ and $I_h/I_v$ is:

$$\frac{I_h}{I_v} = \tan\theta \tag{5}$$

The desired response can be obtained from the direct-coupling components and cross-coupling components of the actual response collected from the receiver coils:

$$V_v' = V_{vv}' + V_{hv}' = (V_{vv}\tan\theta + V_{hv})\tan\theta \tag{6}$$

$$V_h' = V_{hh}' + V_{vh}' = V_{hh} + V_{vh}\tan\theta, \tag{7}$$

where $V_v'$ is the desired vertical response component, $V_h'$ is the desired horizontal response component, $V_{vv}'$ and $V_{hh}'$ are the desired direct coupling components of the response, $V_{hv}'$ and $V_{vh}'$ are the desired cross-coupling components of the response, $V_{vv}$ and $V_{hh}$ are the direct coupling components of the actual response at the receiver coils, and $V_{hv}$ and $V_{vh}$ are the cross-coupling components of the actual response at the receiver coils. The term "direct coupling components" means signal portions coupled from the coil components that share a common orientation (e.g., both in the z orientation), while the term "cross-coupling components" means signal portions coupled from the coil components that have different orientations (e.g., x and z orientations).

From equations (6)-(7), the total response at desired angle θ is:

$$V^{total} = V_v' + V_h' = V_{hh} + (V_{vh} + V_{hv})\tan\theta + V_{vv}\tan^2\theta \tag{8}$$

Normalization of equation (8) with factor $1/\cos^2\theta$ results in:

$$V_{normalized}^{total} = V_{hh}\cos^2\theta + (V_{vh} + V_{hv})\sin\theta\cos\theta + V_{vv}\sin^2\theta \tag{9}$$

Thus, equation (9) may be used to calculate the response at the desired tilt angle θ using the actual physical response. A similar equation may be used to calculate the response at the desired tilt angle θ if the actual coils are cross-tilted coils with tilt angles of 45 degrees and –45 degrees:

$$V_{normalized}^{total} = V_{hh}\cos^2(\theta+45) + (V_{vh}+V_{hv})\sin(\theta+45)\cos(\theta+45) + V_{vv}\sin^2(\theta+45) \tag{10}$$

Equation (10) may be generalized as follows:

$$V_{normalized}^{total} = V_{hh}\cos^2(\theta+x) + (V_{vh}+V_{hv})\sin(\theta+x)\cos(\theta+x) + V_{vv}\sin^2(\theta+x), \tag{11}$$

where x is the absolute value of the actual tilt angles of the coils.

Figure 5A:
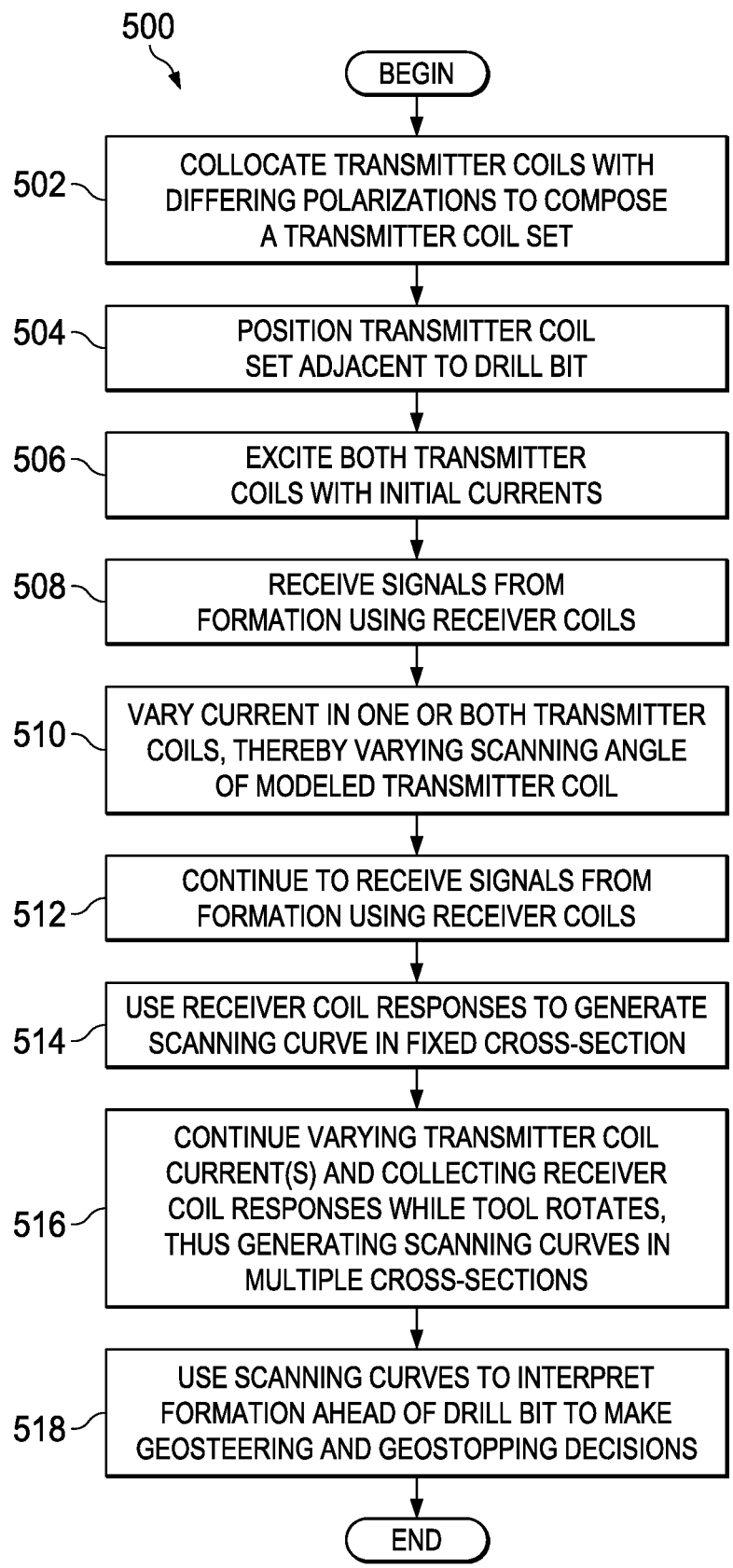
FIG. 5A is a flow diagram of a method to manipulate transmitter coil currents to model a transmitter coil at a desired tilt angle.

FIG. 5A is a flow diagram of a method 500 to manipulate transmitter coil currents to model a transmitter coil at a desired tilt angle. The method 500 begins with collocating transmitter coils with differing polarizations (e.g., transverse and coaxial; cross-tilted) to compose a transmitter coil set (step 502). The method 500 next comprises positioning the transmitter coil set on the drill string, preferably adjacent (e.g., within 5-25 feet) to the drill bit (step 504). The method 500 subsequently comprises exciting both of the transmitter coils with initial currents (step 506) and receiving the resulting signals from the formation using receiver coils (step 508). Next, the method 500 comprises varying the current in one or both of the transmitter coils to change the current ratio between the coils, thereby varying the tilt angle (i.e., scanning angle) of the modeled transmitter coil (step 510). The receiver coils continue to receive signals from the formation (step 512). The method 500 comprises using the receiver coil responses to generate a scanning curve in a fixed cross-section across a range of tilt angles (step 514). A scanning curve is a graphical representation of the relationship between a set of desired tilt angles and the corresponding responses. Such curves may be generated by a processor executing any suitably programmed software, for example, as shown in FIG. 1B. The method 500 also includes continuing to vary the transmitter coil current(s) and collecting receiver coil responses while the tool rotates during drilling, thus generating scanning curves in multiple cross-sections (step 516). Finally, the method 500 includes using the scanning curves to interpret the formation ahead of the drill bit to make geosteering and geostopping decisions (step 518). Method 500 may be modified as desired, for instance, by adding, deleting or modifying one or more steps.

Figure 5B:
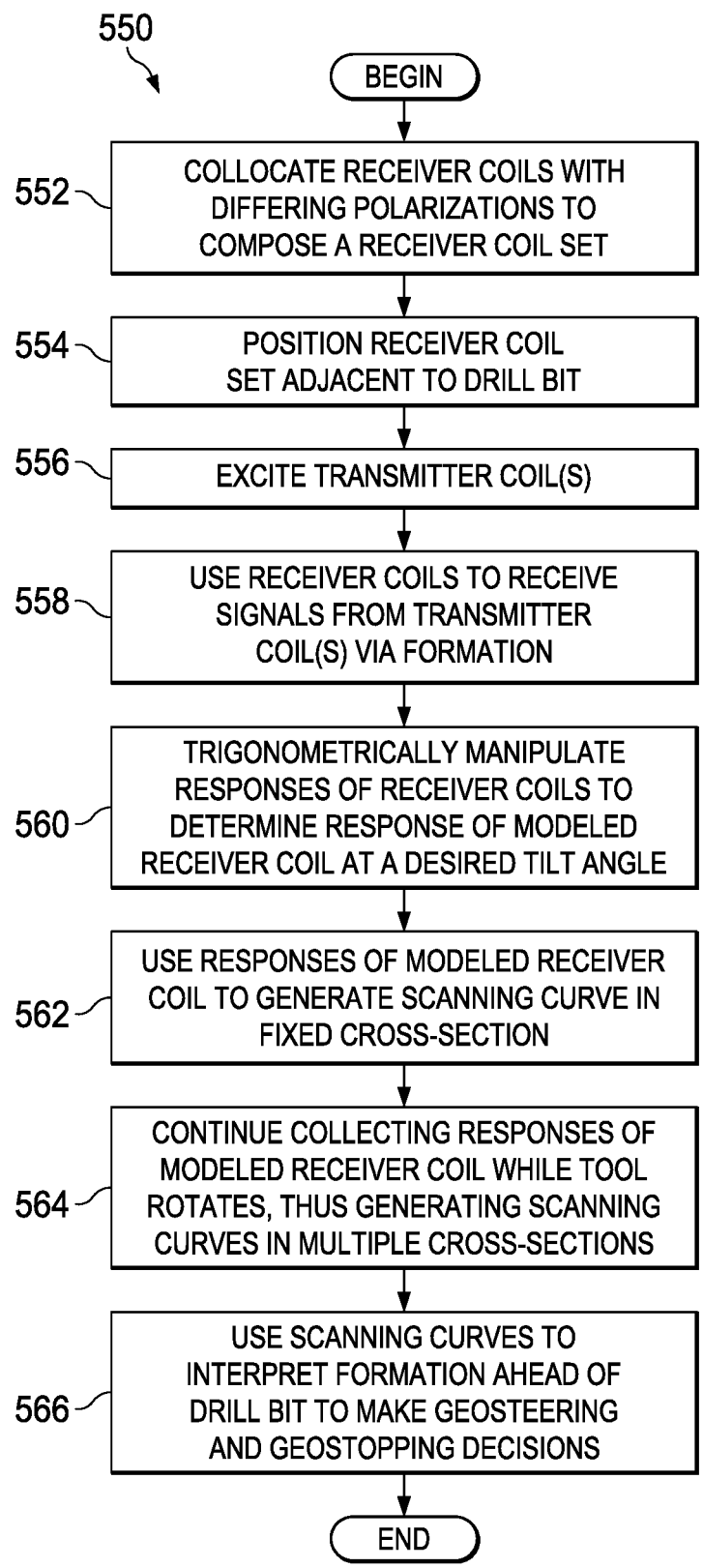
FIG. 5B is a flow diagram of a method to trigonometrically manipulate receiver coil responses to calculate the response of a modeled receiver coil that has a desired tilt angle.

FIG. 5B is a flow diagram of a method 550 to trigonometrically manipulate receiver coil responses to calculate the response of a modeled receiver coil that has a desired tilt angle. The method 550 first includes collocating receiver coils with differing polarizations (e.g., transverse and coaxial; cross-tilted) to compose a receiver coil set (step 552). Next, the method 550 includes positioning the receiver coil set adjacent (e.g., within 5-25 feet) of the drill bit (step 554). The transmitter coils are then excited (step 556). The receiver coils are used to receive signals from the transmitter coils via the formation (step 558). Next, the method 550 comprises trigonometrically manipulating the responses of receiver coils to determine the response of the modeled receiver coil at a desired tilt angle (step 560). Step 560 is performed using, e.g., equation (10), equation (11) or a similar equation that is derived based on the tilt angles of the actual receiver coils being used. The method 550 comprises using the responses of the modeled receiver coil to generate a scanning curve in a fixed cross-section across a range of desired tilt angles (step 562). The method 550 also includes continuing to collect responses of the modeled receiver coil while the tool rotates, thus generating scanning curves in multiple cross-sections (step 564). Finally, the method 550 comprises using the scanning curves to interpret the formation ahead of the drill bit to make geosteering and geostopping decisions (step 566). As with method 500, the method 550 may be adjusted as desired, such as by adding, deleting or modifying one or more steps.

Figure 6:
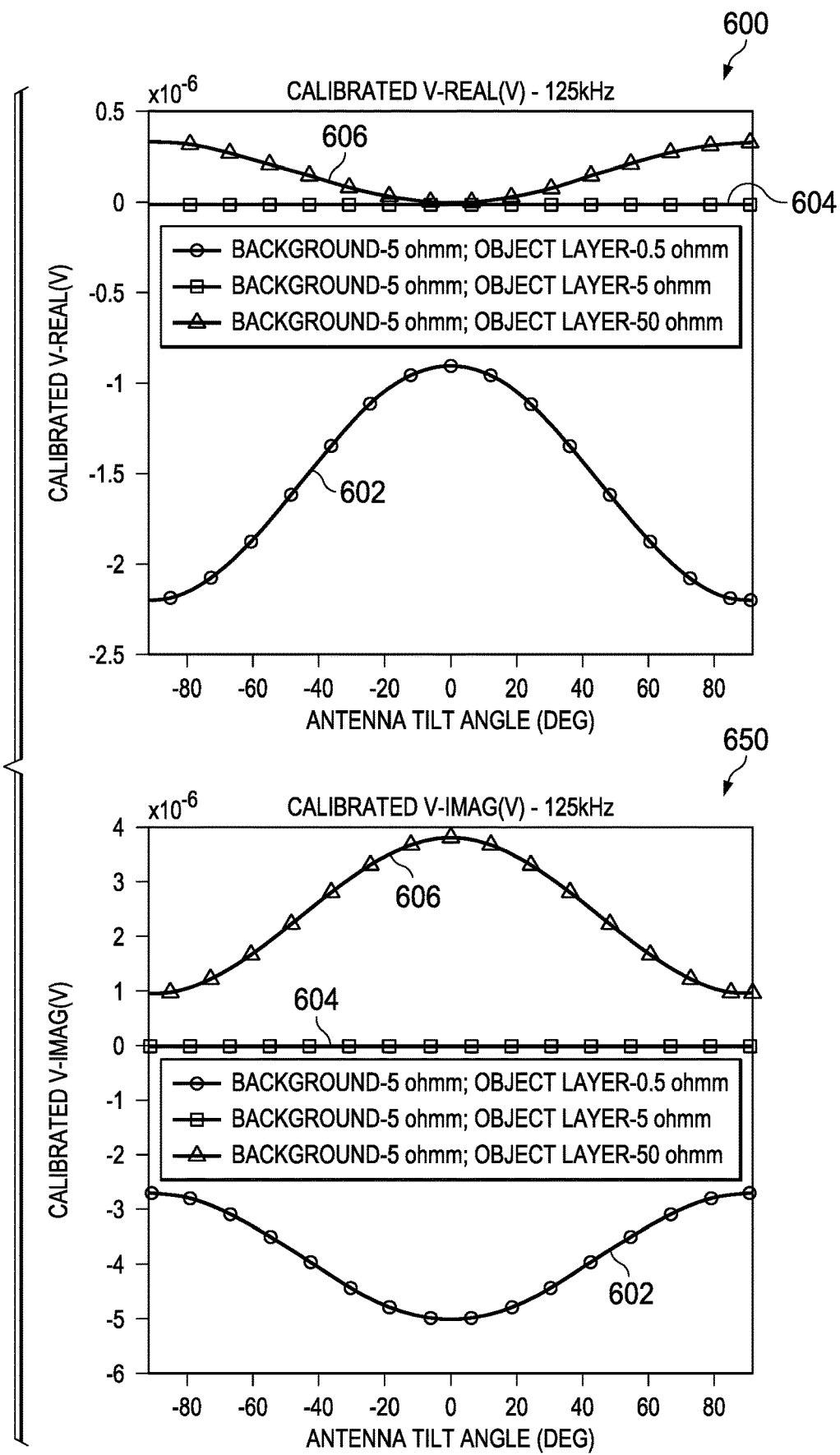
FIG. 6 is a set of graphs that plot the real and imaginary parts of various scanning curves.

FIG. 6 is a set of two graphs 600, 650 that plot the real and imaginary parts of various scanning curves generated using the techniques described above. As explained, a scanning curve describes the relationship between different desired tilt angles and corresponding responses of the modeled receiver coil. The scanning curves shown in graphs 600, 650 assume a background formation layer (i.e., the layer in which the coils are positioned) resistivity of 5 ohm-meters while the hypothetical resistivities of the object layer to be scanned (i.e., the layer ahead of the drill bit) are assumed to be 0.5 ohm-meters, 5 ohm-meters and 50 ohm-meters for the three scanning curves 602, 604, 606, respectively. The curves further assume an antenna frequency of 125 kHz. The difference between graphs 600, 650 is that the graph 600 plots the real parts of the scanning curves, while the graph 650 plots the imaginary parts of the scanning curves. The scanning curves may be generated by, e.g., the processor 150 executing software 154 as depicted in FIG. 1B.

Figure 7:
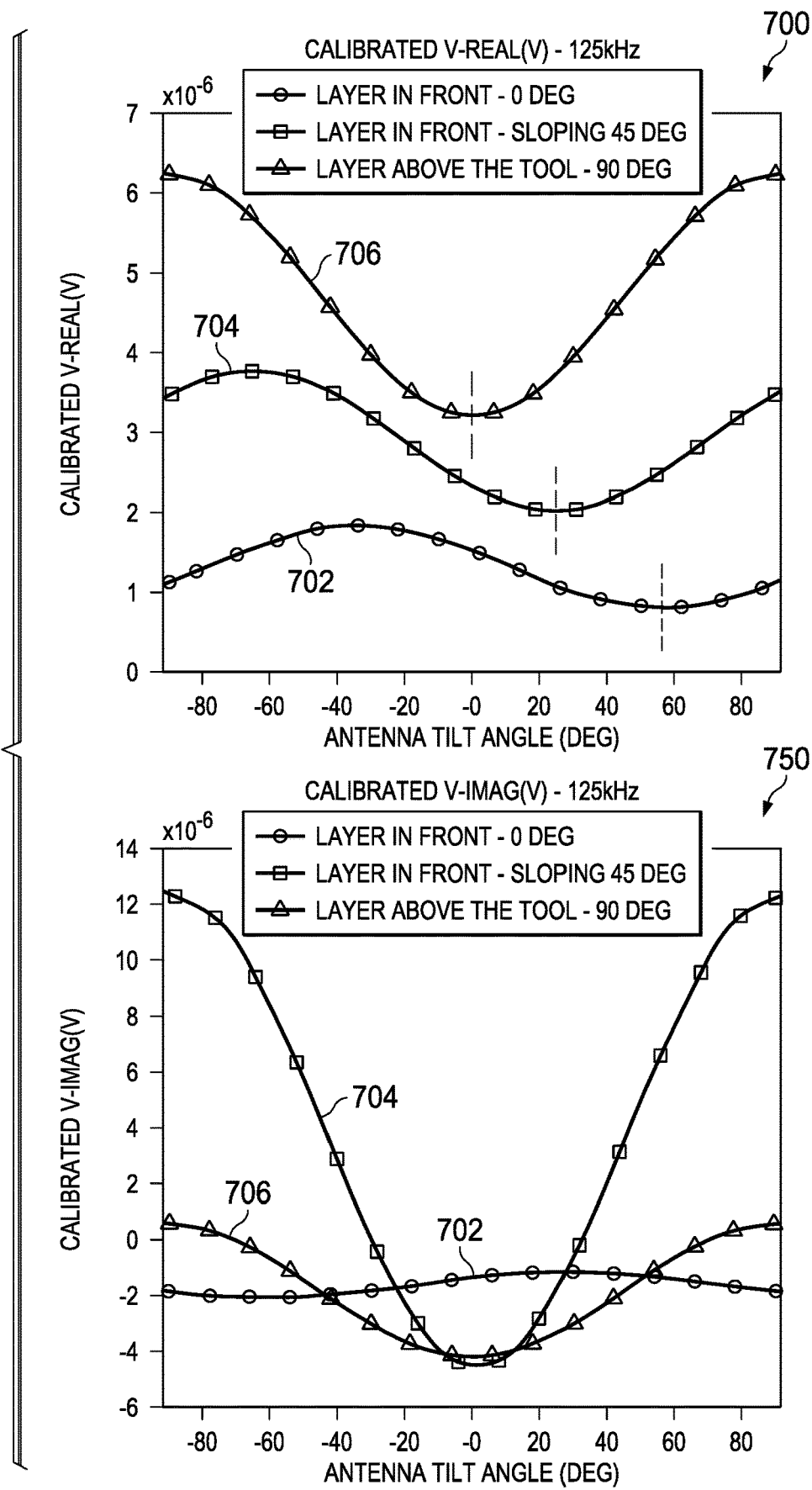
FIG. 7 is another set of graphs that plot the real and imaginary parts of various scanning curves.

FIG. 7 is a set of two graphs 700, 750 that plot the real and imaginary parts of various scanning curves obtained using the techniques described above. As explained, a scanning curve describes the relationship between different desired tilt angles and corresponding responses of the modeled receiver coil. The scanning curves shown in graphs 700, 750 assume an antenna frequency of 125 kHz. The three scanning curves 702, 704, 706 represent differing formation dip angles (i.e., the angle of the object formation layer relative to a vertical plane) of 0 degrees, 45 degrees and 90 degrees, respectively. The graph 700 shows the real parts of the scanning curves, while graph 750 plots the imaginary parts of the scanning curves. The scanning curves may be generated by, e.g., the processor 150 executing software 154 as depicted in FIG. 1B.

Numerous other variations and modifications will become apparent to those skilled in the art once the above disclosure is fully appreciated. It is intended that the following claims be interpreted to embrace all such variations, modifications and equivalents. In addition, the term "or" should be interpreted in an inclusive sense. Further, the term "couple," as used herein, implies a direct or indirect connection between two or more components.

In at least some embodiments, a system comprises: a drill string; a first receiver coil coupled to the drill string at a fixed tilt angle with respect to a longitudinal axis of the drill string; a second receiver coil coupled to the drill string at another fixed tilt angle with respect to the longitudinal axis of the drill string; and a processor coupled to the first and second receiver coils and configured to trigonometrically manipulate a response of the first receiver coil and a response of the second receiver coil to determine a response of a modeled receiver coil having a desired tilt angle with respect to the longitudinal axis of the drill string, wherein said responses are based on a subterranean formation layer. These embodiments may be modified to include one or more of the following concepts in any order and in any combination: wherein the desired tilt angle of the modeled receiver coil is variable; wherein said processor is configured to vary a ratio of currents that flow through multiple transmitter coils mounted on the drill string; wherein the processor is configured to mathematically determine aid response of the modeled receiver coil using the desired tilt angle; wherein the response of the modeled receiver coil is determined using the expression: $V_{hh} \cos^2(\theta+x)+(V_{vh}+V_{hv}) \sin(\theta+x) \cos(\theta+x)+V_{vv} \sin^2(\theta+x)$, where $\theta$ is the desired tilt angle, $x$ is the absolute value of either the fixed tilt angle or the another fixed tilt angle, $V_{hh}$ and $V_{vv}$ are the direct coupling components of the responses of the first and second receiver coils, and $V_{hv}$ and $V_{vh}$ are the cross coupling components of the responses of the first and second receiver coils; wherein said first and second receiver coils are coaxial and transverse coils, respectively; wherein said first and second receiver coils are cross-tilted coils; wherein a real part of the response of the modeled receiver coil indicates a dip angle of said formation layer; wherein the processor is configured to generate a scanning curve that describes a relationship between different desired tilt angles and corresponding responses of the modeled receiver coil.

In at least some embodiments, a system comprises: a drill string; a first transmitter coil coupled to the drill string at a fixed tilt angle with respect to a longitudinal axis of the drill string; a second transmitter coil coupled to the drill string at another fixed tilt angle with respect to the longitudinal axis of the drill string; and a processor coupled to the first and second transmitter coils and configured to adjust a first current flowing through the first transmitter coil, a second current flowing through the second transmitter coil, or both to model a transmitter coil having a desired tilt angle with respect to the longitudinal axis of the drill string, wherein the processor is configured to determine a response of a receiver coil that receives signals that are generated by the modeled transmitter coil and that pass through a subterranean formation layer. These embodiments may be modified to include one or more of the following concepts, in any order and in any combination: wherein the desired tilt angle is variable; wherein the processor is configured to vary the first current, the second current, or both to achieve the desired tilt angle for the modeled transmitter coil; wherein a real part of the response indicates a dip angle of said subterranean formation layer; wherein the first and second transmitter coils are coaxial and transverse coils, respectively; wherein the first and second transmitter coils are cross-tilted coils.

At least some embodiments comprise a computer readable medium comprising software, which, when executed by a processor, causes the processor to: receive a response of a first receiver coil that is coupled to a drill string at a fixed tilt angle with respect to a longitudinal axis of the drill string; receive a response of a second receiver coil that is coupled to the drill string at another fixed tilt angle with respect to the longitudinal axis of the drill string; and mathematically manipulate said responses of the first and second receiver coils to determine a response of a modeled receiver coil having a desired tilt angle with respect to the longitudinal axis of the drill string, wherein said responses are based on a subterranean formation layer. These embodiments may be modified using one or more of the following concepts in any order and in any combination: wherein the software causes the processor to mathematically determine said response of the modeled receiver coil using the desired tilt angle; wherein the desired tilt angle is variable; wherein the first and second receiver coils are transverse and coaxial coils, respectively; wherein the response of the modeled receiver coil is determined using the expression: $V_{hh} \cos^2(\theta+x)+(V_{vh}+V_{hv}) \sin(\theta+x) \cos(\theta+x)+V_{vv} \sin^2(\theta+x)$, where $\theta$ is the desired tilt angle, x is the absolute value of either the fixed tilt angle or the another fixed tilt angle, $V_{hh}$ and $V_{vv}$ are the direct coupling components of the responses of the first and second receiver coils, and $V_{hv}$ and $V_{vh}$ are the cross coupling components of the responses of the first and second receiver coils.

What is claimed is:

1. A system, comprising:
  a drill string;
  a first receiver coil coupled to the drill string at a fixed tilt angle with respect to a longitudinal axis of the drill string;
  a second receiver coil coupled to the drill string at another fixed tilt angle with respect to the longitudinal axis of the drill string; and
    a processor coupled to the first and second receiver coils and configured to trigonometrically manipulate a response of the first receiver coil and a response of the second receiver coil, determine a response of a modeled receiver coil having a desired tilt angle with respect to the longitudinal axis of the drill string, wherein said responses are based on a subterranean formation layer, generate a scanning curve across a plurality of desired tilt angles, and identify a second subterranean formation layer ahead of the drill bit by using the scanning curve.

2. The system of claim 1, wherein the desired tilt angle of the modeled receiver coil is variable.

3. The system of claim 1, wherein said processor is configured to vary a ratio of currents that flow through multiple transmitter coils mounted on the drill string.

4. The system of claim 1, wherein the processor is configured to mathematically determine said response of the modeled receiver coil using the desired tilt angle.

5. The system of claim 1, wherein the response of the modeled receiver coil is determined using the expression: $V_{hh} \cos^2(\theta+x)+(V_{vh}+V_{hv}) \sin(\theta+x) \cos(\theta+x)+_{vv} \sin^2(\theta+x)$, where $\theta$ is the desired tilt angle, x is the absolute value of either the fixed tilt angle or the another fixed tilt angle, $V_{hh}$ and $V_{vv}$ are the direct coupling components of the responses of the first and second receiver coils, and $V_{hv}$ and $V_{vh}$ are the cross coupling components of the responses of the first and second receiver coils.

6. The system of claim 1, wherein said first and second receiver coils are coaxial and transverse coils, respectively.

7. The system of claim 1, wherein said first and second receiver coils are cross-tilted coils.

8. The system of claim 1, wherein a real part of the response of the modeled receiver coil indicates a dip angle of said subterranean formation layer.

9. The system of claim 1, wherein the scanning curve that describes a relationship between different desired tilt angles and corresponding responses of the modeled receiver coil.

10. A system, comprising:
  a drill string;
  a first transmitter coil coupled to the drill string at a fixed tilt angle with respect to a longitudinal axis of the drill string;
  a second transmitter coil coupled to the drill string at another fixed tilt angle with respect to the longitudinal axis of the drill string; and
  a processor coupled to the first and second transmitter coils and configured to adjust a first current flowing through the first transmitter coil, a second current flowing through the second transmitter coil, or both to model a transmitter coil having a desired tilt angle with respect to the longitudinal axis of the drill string,
    wherein the processor is configured to determine a response of a receiver coil that receives signals that are generated by the modeled transmitter coil and that pass through a subterranean formation layer, and generate a scanning curve across a plurality of desired tilt angles, and identify a second subterranean formation layer ahead of the drill bit by using the scanning curve.

11. The system of claim 10, wherein the desired tilt angle is variable.

12. The system of claim 10, wherein the processor is configured to vary the first current, the second current, or both to achieve the desired tilt angle for the modeled transmitter coil.

13. The systems of claim 10, wherein a real part of the response indicates a dip angle of said subterranean formation layer.

14. The systems of claim 10, wherein the first and second transmitter coils are coaxial and transverse coils, respectively.

15. The systems of claim 10, wherein the first and second transmitter coils are cross-tilted coils.

16. A non-transitory computer readable medium containing computer instructions stored therein for causing a computer processor to perform:
receive a response of a first receiver coil that is coupled to a drill string at a fixed tilt angle with respect to a longitudinal axis of the drill string;
receive a response of a second receiver coil that is coupled to the drill string at another fixed tilt angle with respect to the longitudinal axis of the drill string;
mathematically manipulate said responses of the first and second receiver coils to determine a response of a modeled receiver coil having a desired tilt angle with respect to the longitudinal axis of the drill string, wherein said responses are based on a subterranean formation layer,
generate a scanning curve across a plurality of desired tilt angles; and
identify a second subterranean formation layer ahead of the drill bit by using the scanning curve.

17. The medium of claim 16, wherein the computer instructions causes the processor to mathematically determine said response of the modeled receiver coil using the desired tilt angle.

18. The medium of claim 16, wherein the desired tilt angle is variable.

19. The medium of claim 16, wherein the first and second receiver coils are transverse and coaxial coils, respectively.

20. The medium of claim 16, wherein the response of the modeled receiver coil is determined using the expression:
$V_{hh} \cos^2(\theta+x)+(V_{vh}+V_{hv}) \sin(\theta+x) \cos(\theta+x)+V_{vv} \sin^2(\theta+x)$,
where $\theta$ is the desired tilt angle, x is the absolute value of either the fixed tilt angle or the another fixed tilt angle, $V_{hh}$ and $V_{vv}$ are the direct coupling components of the responses of the first and second receiver coils, and $V_{hv}$ and $V_{vh}$ are the cross coupling components of the responses of the first and second receiver coils.

21. A system, comprising:
a drill string;
a first receiver coil coupled to the drill string at a fixed tilt angle with respect to a longitudinal axis of the drill string;
a second receiver coil coupled to the drill string at another fixed tilt angle with respect to the longitudinal axis of the drill string; and
a processor coupled to the first and second receiver coils and configured to trigonometrically manipulate a response of the first receiver coil and a response of the second receiver coil to determine a response of a modeled receiver coil having a desired tilt angle with respect to the longitudinal axis of the drill string, wherein said responses are based on a subterranean formation layer, wherein the response of the modeled receiver coil is determined using the expression:
$V_{hh} \cos^2(\theta+x)+(V_{vh}+V_{hv}) \sin(\theta+x) \cos(\theta+x)+V_{vv} \sin^2(\theta+x)$,
where $\theta$ is the desired tilt angle, x is the absolute value of either the fixed tilt angle or the another fixed tilt angle, $V_{hh}$ and $V_{vv}$ are the direct coupling components of the responses of the first and second receiver coils, and $V_{hv}$ and $V_{vh}$ are the cross coupling components of the responses of the first and second receiver coils.

* * * * *

UNITED STATES PATENT AND TRADEMARK OFFICE
CERTIFICATE OF CORRECTION

PATENT NO. : 10,989,044 B2  Page 1 of 1
APPLICATION NO. : 15/556577
DATED : April 27, 2021
INVENTOR(S) : Ma et al.

It is certified that error appears in the above-identified patent and that said Letters Patent is hereby corrected as shown below:

On the Title Page

Item (54) and in the Specification, Column 1 Lines 1-3 please delete:
"Modeled Transmitter and Receiver Coils with Variable Title Angles for Formation Scanning"
And replace with:
--Modeled Transmitter and Receiver Coils with Variable Tilt Angles for Formation Scanning--

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*